Figure 1:
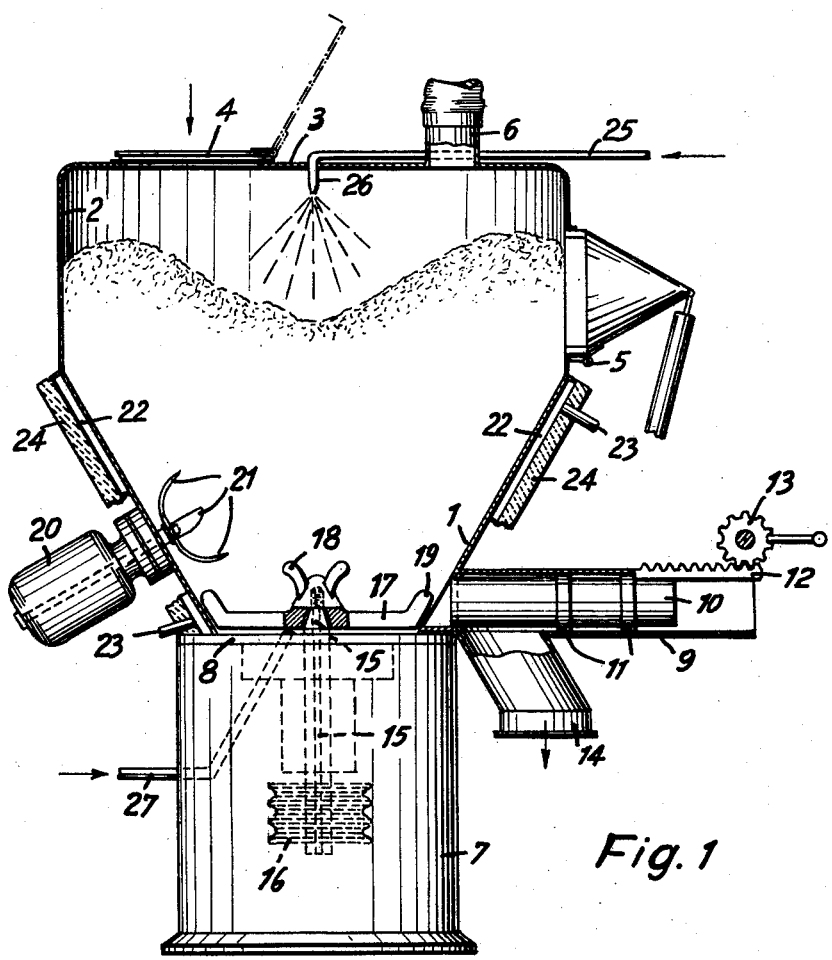

May 26, 1964　　　W. LÖDIGE ETAL　　　3,134,576
APPARATUS FOR MIXING POWDERED, FINE-GRAINED OR FIBROUS PRODUCTS
Filed March 27, 1961　　　　　　　　　　　4 Sheets-Sheet 1

INVENTORS
WILHELM LÖDIGE
FRITZ LÖDIGE
JOSEF LÜCKE
BY
Almon S. Nelson
ATTY.

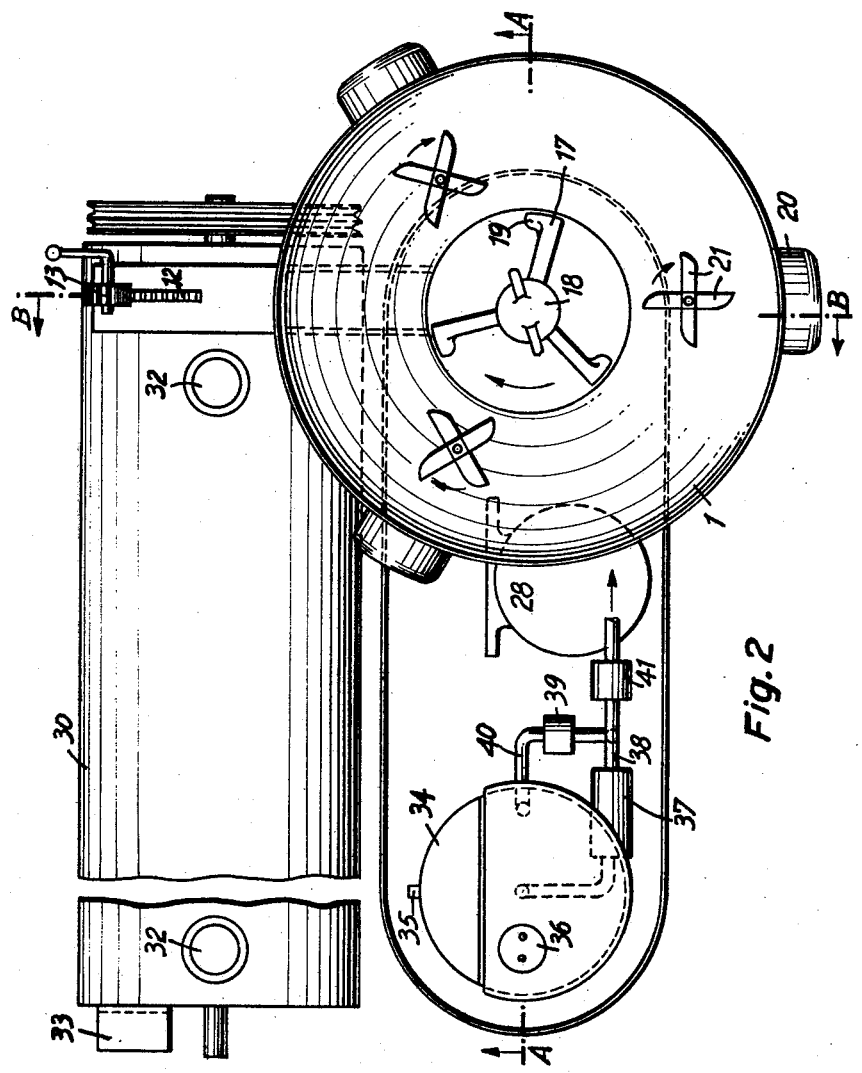

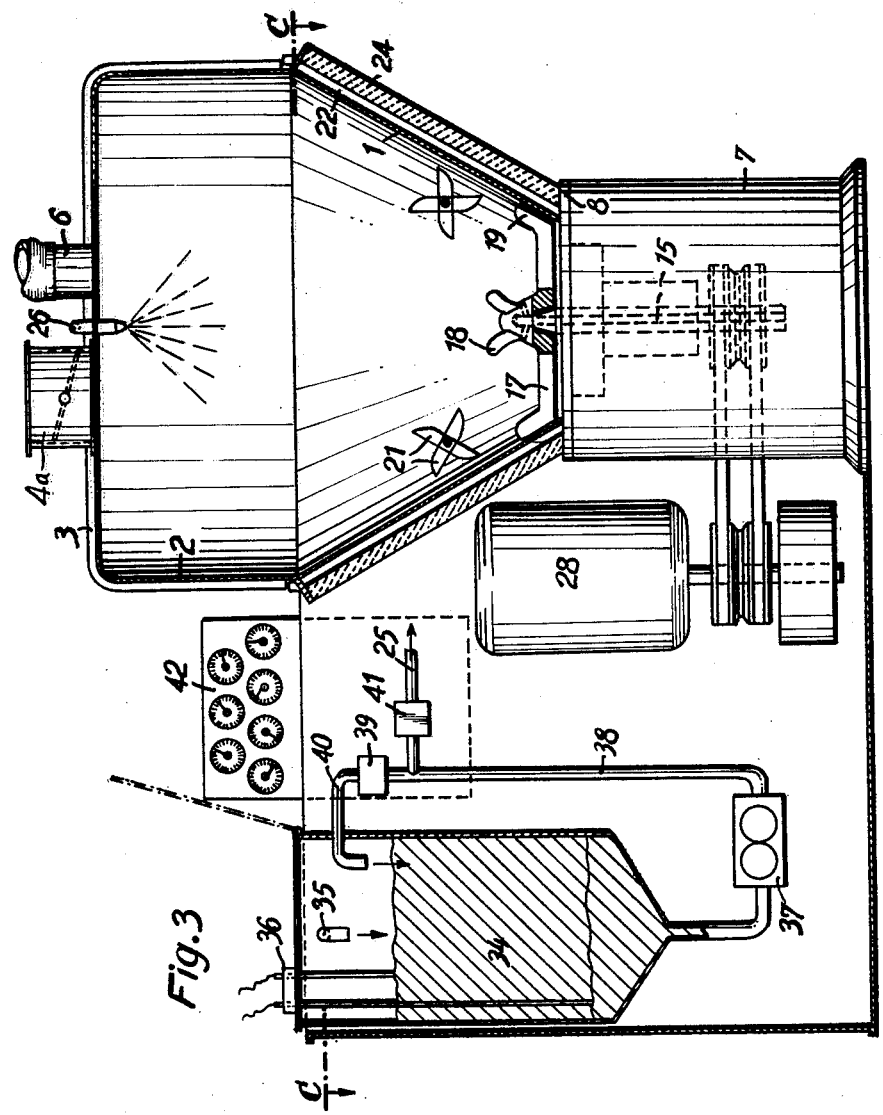

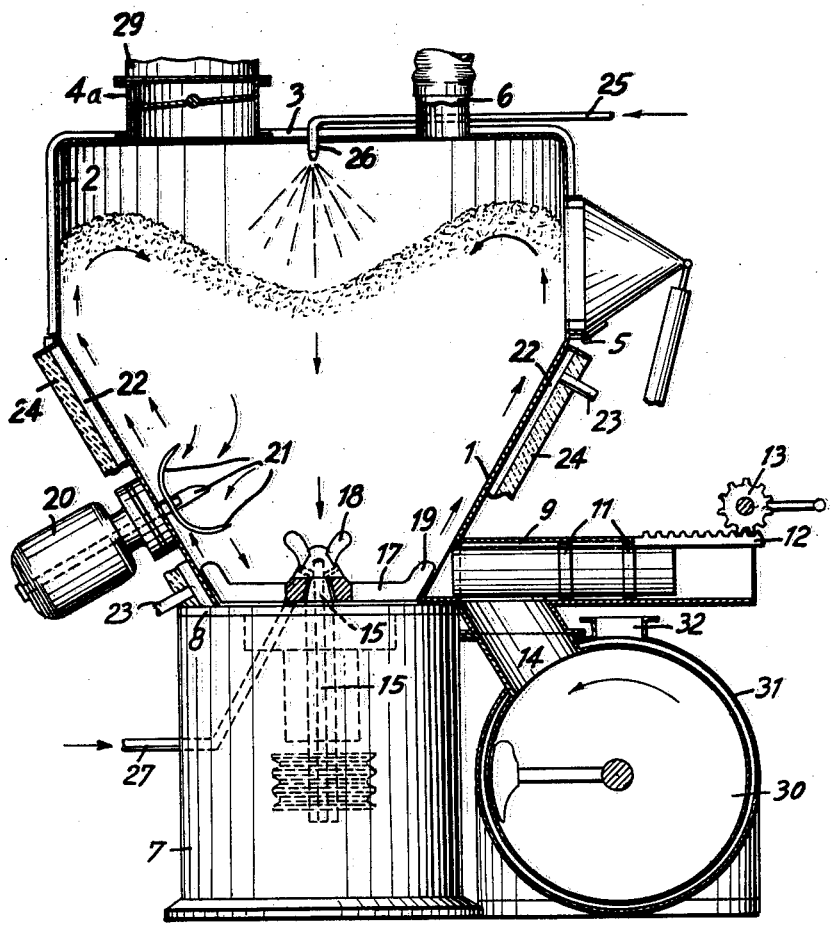
B-B  Fig.4

United States Patent Office 3,134,576
Patented May 26, 1964

3,134,576
APPARATUS FOR MIXING POWDERED, FINE-
GRAINED OR FIBROUS PRODUCTS
Wilhelm Lödige, 9c Elsener Strasse; Fritz Lödige, 9b Elsener Strasse; and Josef Lücke, Im Lohfeld 13, all of Paderborn, Germany
Filed Mar. 27, 1961, Ser. No. 98,665
Claims priority, application Germany Apr. 4, 1960
8 Claims. (Cl. 259—21)

This invention relates to an apparatus for mixing powdered, fine-grained or fibrous products. In particular, it relates to an apparatus for the homogeneous mixing of powdered or fine-grained synthetic plastic compositions with the addition of liquids such as liquid plasticizers and the slight gelling of the compositions.

In the plastics processing industry, various types of mixers are used for the mixing of powdered or fine-grained synthetic plastic compositions with dyestuffs and/or other additives and for the admixture of liquids such as liquid plasticizers, possibly during the heating and slight gelling of the plastic compositions. There are types of mixers in which a horizontal mixing container is in the form of a trough. These mixers, which are provided with screw-type conveying and mixing members, work on the counter-current principle, that is to say the materials to be mixed, which are situated towards the middle of the container and close to the wall of the container respectively are conveyed past one another in opposite directions. If these mixers have heating jackets, they can also be used for the mixing and slight gelling of the synthetic plastic compositions. However, they have the disadvantage, of not always producing products devoid of streaks and, in the processing of PVC emulsion in particular, they produce nonuniform material, i.e. material which is partly agglomerated to form thick lumps, while other parts still have a powdery nature. Moreover, at those parts of the trough-shaped container which are not swept by the mixing members, there is a risk of some material clinging to the walls and suffering discoloration as a result of burning, if the container wall is heated to a relatively high temperature during the slight gelling process. In addition, the thorough cleaning of the mixer which is necessary when changing over to material of another colour is difficult and time consuming.

Other mixers with horizontal mixing drums and heated walls have mixing and friction members by means of which the homogeneous mixing of the various components is effected. The heating of the material being mixed, for the purpose of initial gelling is, in these mixers, effected primarily through the heated walls of the container and to a small extent through the mechanical work of the mixing and friction members. Although useful final results are obtained in these machines, the cleaning of the mixer is nevertheless very time consuming when there is a change of colour in the following charges.

Another mixer for this purpose comprises a mixing container with a vertical drum axis in which a rapidly rotating mixing and centrifugal member is mounted just above the bottom. The mixing and centrifugal member may vary in construction. These mixers may also have heating devices at the wall of the container. The material being mixed in these mixers is pressed against the vertical side wall of the mixing container as a result of the centrifugal action of the rapidly rotating mixing and centrifugal member present at the bottom of the container. Material which is subsequently pressed out, urges the material up the walls until—at a greater or lesser height—it falls into the middle of the container where it sinks again to be freshly forced up the outside walls. Because of their very high power consumption, these mixers can only be operated profitably up to a certain size. Moreover, in such mixers with vertical or only slightly inclined side walls, there is no guarantee that all the material being mixed will always participate uniformly in the mixing process, particularly when a certain structural size is exceeded. Material being mixed, which lies between the bottom of the container and the surface, falls back into the middle of the container in greater quantities and this is encouraged by the superimposed weight of the material being mixed. Consequently, some material may remain in the upper portion of the material or only participate in the mixing process after some delay. In addition, such mixers have the disadvantage that the final temperature of the material being mixed, which should preferably always be maintained constant, cannot be adhered to precisely during the mixing and initial gelling process because a very high pressure is exerted on the material in the corners or slightly rounded corners between the bottom of the container and the vertical side wall, and consequently excessive local friction is caused in some of the material being mixed. The associated rise in temperature at the walls in the lower region of the container is so great that the temperature rises too rapidly and so cannot be regulated, particularly towards the end of the mixing and initial gelling process, when the product has become granular, and so automation of the mixing process by means of electrical switchgear becomes difficult or impossible. On the upper portions of the side wall of these mixers, the friction decreases as a result of the loosening of the material, so that, if the wall of the mixing container is heated to a comparatively high temperature, there is a risk of the material adhering to the wall of the container at these points and becoming discoloured as a result of burning. It has been found that products produced with such mixers are not sufficiently uniform in grain size and that as a result of the inadequate temperature control in the final phase of the mixing and initial gelling process there is a risk of some of the material being mixed becoming plastic, particularly in the case of mixtures with a high proportion of plasticizer. This gives rise to a considerable increase in power consumption, as a result of which the mixing and centrifugal member may be brought to a standstill. The contents of the mixing container can then only be removed with a hammer and chisel or similar tools, after cooling down. A further disadvantage of such mixers lies in the fact that mixers having a comparatively large capacity, for example 600 litres, are difficult to clean despite the few internal fittings. As a result of the height of the mixing container, a person standing on the outside is no longer able to reach the mixing and centrifugal mechanism at the bottom of the container and to clean it thoroughly and quickly.

The apparatus according to the invention comprises in combination

A vertical closable mixing container, the lower portion of the side wall of the said mixing container being tapered and becoming narrower towards the bottom with an angle of inclination of about 40 to 70°, A shaft being mounted centrally and vertically in the base of the said mixing container, A rotary conveyor member being mounted on the said shaft close to the bottom of the said mixing container and being formed in such a way that, on its rotation, the material being mixed is conveyed outwards from the centre of the mixing container and is forced up the wall of the mixing container by following material, At least one rapidly rotating comminuting member being mounted in the tapered portion of the container wall, a device for driving the shaft, on which the conveyor member is mounted, at such a speed that the material being mixed is conveyed up the wall of the said mixing container at least up to the said comminuting member, A device for driving the said rapidly rotating comminuting member, The devices for driving the conveyer member and the comminuting member being mounted outside of the mixing container, and A closable outlet in the side wall of the mixing container, close to the bottom of the said container.

The rotary conveying member may be a multi-armed centrifugal member, in which case the arms, which preferably reach close to the side wall of the mixing container, may be provided with bent-up projections at the rear edges of their outer end. As a result of this, the material being mixed is deflected up the container wall. The rotary conveying member may also be in the form of a disc on which lowered or raised portions may be provided in a suitable form, for example arms, by means of which the centrifugal action of the disc is increased. The outer edge of such a disc may also be bent upwards for the purpose of deflecting the material being mixed into the vertical direction. The drive of the shaft carrying the rotary conveying member is effected in the usual manner, for example by means of V-belts. The speed at which the shaft is driven depends on the nature and size of the rotary conveying member and on the nature of the material being mixed. However, the speed must be always sufficiently high that the material being mixed is forced up the tapered portion of the mixing container into the range of operation of the chopper at least to such an extent that the chopper destroys any agglomeration which may have formed and churns up the material being mixed. The rotary conveying member is preferably adapted for replacement, in order to facilitate cleaning.

The inclination of the lower tapered portion of the wall of the mixing container must be such that on the one hand no excessive impact pressure and no excessive friction occurs at the point where the material slung aside by the rotary conveying member impinges on the tapered side wall, and on the other hand there is sufficiently high friction between the wall and the material being mixed as a result of a sufficiently high layer of material above the tapered lower portion of the side wall of the mixing container, as a result of which, adhesion of the material to the wall of the mixing container, which may easily occur particularly when the mixing container is heated, is avoided. The inclination of the tapered portion of the wall of the mixing container may conveniently amount to about 40 to 70° and preferably about 50 to 60°. For the heating of the material being mixed, the mixing container may be provided with a double jacket which is insulated from the outside, in order to form a heating chamber through which a heating medium is conveyed in an appropriate manner. During the mixing and intial gelling of synthetic plastic compositions, it has been found convenient to provide only the lower, tapered portion of the wall of the mixing container, up which the material rises with comparatively great friction, with a heating jacket, or possibly to provide a separate heating jacket at the upper, vertical portion of the wall of the mixing container, and to convey a heating medium through this at a lower temperature since the friction between the wall and the material being mixed is considerably less at the vertical portion of the wall of the mixing container. The adhesion of the material to the wall of the mixing container and discolouration and decomposition of the material as a result of overheating, can be prevented in this manner. In order to facilitate cleaning, the mixing container is constructed in such a manner that its upper portion can be hinged open.

The supply of liquids may, for example, be carried out by means of a suitable device, for example a nozzle, which is built into the cover plate of the mixing container. In many cases, rapid cooling of the material is necessary. For this purpose, a means of supplying air may be provided in a suitable manner in the base plate of the mixing container, or the shaft carrying the rotary conveying member may be of hollow construction and be closed by a hub or wing nut provided with lateral apertures.

The comminuting member (chopper) preferably consists of two crossed knives which are preferably replaceable. Their outer ends are preferably bent in the direction of the interior of the mixing container. The speed of rotation of the comminuting member, as in the known devices of this type, amounts to about 3000 r.p.m. with a diameter of about 200 mm. The drive of the comminuting member is effected, for example, as a result of the fact that the motor is mounted on the outside of the mixing container and the stub shaft of the motor is taken through the wall of the mixing container by means of a suitable seal, to have the comminuting member mounted on it at a distance of from 10 to 80 mm. from the inside of the wall of the mixing container. It is also possible to mount the comminuting member on a separate shaft which is driven by a motor by means of a V-belt through a V-belt pulley which is mounted on the shaft outside the mixing container. If a plurality of comminuting members are installed, their drive may be effected by means of one or more motors. The height at which the comminuting members are arranged in the tapered portion of the wall of the mixing container, depends on the size of the mixing container. In general, the comminuting members are mounted about half way up the tapered portion of the wall of the mixing container or somewhat lower. In any case, the comminuting member should be so low that co-operation between the rotary conveying member and the comminuting member is assured. Any agglomerations which form during the mixing and/or initial gelling process are immediately destroyed as a result of the action of the comminuting member. The installation of the comminuting member has the further advantage, however, that the mixing operation, which takes place without the action of the comminuting member, is further accelerated and intensified. As a result of the centrifugal action of the crossed, cup-shaped knives of the comminuting member or comminuting members, the material being mixed in the mixing container is churned up and distributed. The number of comminuting members to be installed depends on the size of the mixing container. In order to obtain short mixing times in particularly large mixing containers, for example with a useful capacity of more than 1000 litres, it is possible to install two rows of comminuting members, one above the other, in the lower tapered portion of the mixing container. The greater the number of comminuting members which can be successively switched off shortly before the final temperature is reached during the initial gelling process for plastics, the more accurately can the final temperature be adhered to and the more uniform is the granulation.

The mixers of the invention may be used not only in the plastics processing industry but also for mixing other products. Thus they are also suitable for the production of thin mixtures of flour and fatty substances, for example lecithin butter, beef fat and for the homogeneous mixing of materials in the form of very fine powders such as dyes.

A mixing apparatus according to the invention is illustrated in the accompanying drawings of which:

FIG. 1 shows the mixing apparatus,

FIGURES 2 to 4 show an automatic plant for the mixing of powdered or fine-grained synthetic plastic compositions with dyestuffs and possibly with other powdered or fine-grained additives and the initial gelling of the products with the admixture of liquid plasticizer and the like, using the apparatus according to the invention. FIGURE 2 shows a view of this installation in section along the line C—C in FIGURE 3, FIGURE 3 shows the installation in section along A—A and FIGURE 4 shows the installation in section along B—B in FIGURE 2.

For the sake of clarity, only the most important parts are shown in FIGURES 2 to 4.

The apparatus according to the invention has a mixing container with a portion 1 with tapers towards the bottom and an upper portion 2 with a vertical wall. The tapered lower portion of the wall of the mixing container has an angle of inclination of about 60°. The mixing container is closed at the top by a cover plate 3 having a filling aperture which can be closed by a flap 4 of FIG. 1, or 4a of FIGS. 3 and 4, or in another suitable manner. In order to facilitate the cleaning of the mixing container, the upper portion 2 can be raised by means of a hinge 5 or the like, in any suitable manner, for example by means of a hydraulic lever jack. In order to compensate for any reduced or excess pressure which may occur in the mixing container, an extractor shaft 6 is provided in the cover plate 3 and is closed in any suitable manner, for example by means of a filter plate or a hood, in order to prevent the emergence of the material being mixed. The mixing container rests on a pedestal 7 or the like, an upper plate 8 of which may also form the base plate of the mixing container.

A discharge aperture, which can be closed by means of a closing mechanism 9 to 14, is provided in the tapered side wall of the mixing container, directly above the bottom of the container. The mechanism consists of a cylinder 9 which is connected to the mixing container through the discharge aperture and which contains a reciprocable piston 10 sealed by piston rings 11. The piston 10 is reciprocated by a rack 12 and pinion 13, but is held against rotation because the rack 12 is guided in a slot in the cylinder 9.

On withdrawal of the piston, the material being mixed falls through the discharge aperture and a discharge conduit 14 into a suitable container. A central and vertical shaft 15 is mounted in the bottom of the mixing container and is driven through a V-belt pulley 16 by means of V-belts from a motor which is mounted, for example, outside the pedestal. The portion of the shaft 15 which projects into the mixing container becomes narrower towards the top and has at its end a screw thread. A rotary conveying member with arms 17 can therefore easily be mounted on the shaft and secured in position by means of a wing nut 18; this arrangement permits easy replacement of the rotary conveying member. Upturned projections 19 are provided at the edges of the outer ends of the arms 17 which are at the rear relative to the direction of rotation and deflect upwards the material at the side.

A motor 20 is secured to the tapered portion 1 of the side wall of the mixing container, and replaceably mounted on the end of a shaft which projects into the container, are crossed knives 21, which are bent upwards in the form of a calyx and which serve as a comminuting member or chopper.

In order to be able to heat or cool the material being mixed during the mixing operation, a jacket 22 including an inlet and outlet conduit 23 is provided on the outside wall of the mixing container. The jacket has insulation 24 on the outside.

Liquid to be added to the material being mixed is supplied through a feed pipe 25 and is sprayed on to the material being mixed, in finely divided form, by means of a nozzle 26.

If the material being mixed is to be rapidly cooled by blowing in air, or if air or other gases are to be introduced into the material being mixed for other reasons, this is supplied through an inlet pipe 27 leading into the bottom 8 of the mixing container or through the shaft 15 which can then be made hollow.

In FIGURES 2 to 4, the motor driving the rotary conveying member is designated by 28. A connecting hose 29 leads to the storage bunkers for the synthetic plastic materials, dyestuffs and other powdered or fine-grained additives. In this case, the flap 4 of FIGURE 1 is constructed in the form of a throttle valve and is mounted in a suitable connecting conduit. The discharge conduit 14 is here connected to a mixer 30 so that the material falls directly into the mixer 30 on withdrawal of the piston 10. The mixer 30 is provided with a jacket 31 and with admission and discharge conduits 32. The material falling out of the mixing apparatus into the mixer 30 may either be cooled by conveying a suitable medium through the jacket 31 or may be maintained at a specific temperature as required. The discharge of material can be continuously adjusted according to the setting of the discharge aperture in the mixer 30, for example by means of a slide or like device 33.

The mixer 30 is preferably constructed with a greater useful capacity than the upper mixer so that with intensive cooling, the cooling time is shorter than the mixing time in the upper mixer. Depending on the excess size of the mixer 30, the latter may also serve as an intermediate storage. A plasticizer proportioning device includes a reservoir 34. Liquid plasticizer may be conveyed to the reservoir 34 in free fall through the pipe 35 or be conveyed from a larger reservoir by means of a motor-driven conveyor device. A pair of immersion electrodes 36 measure out the amount of liquid necessary for each mixture while the mixer is being filled with powdered substances. A short electrode of this pair switches off the motor of the transfer pump in the pipe 35 when the filling height is reached and a long electrode switches off the pump 37 in the feed pipe 25 to the mixer when the filling height drops below the immersion depth. During each mixing operation, the pressure pump 37 delivers the amount of liquid plasticizer which is present between the two ends of the immersion electrodes, from the reservoir 34 into the pipe 38. Depending on the setting of the excess-pressure valve 39, a constant pressure, such as is necessary for the injection of liquids, for example 3 atmospheres can be produced at the nozzle device because with a higher pressure, the excess of liquid conveyed is allowed through by the excess-pressure valve 39 and flows back into the reservoir 34 through the pipe 40. A pressure gauge 41 indicates in atmospheres the pressure of the liquid in the pipe 25. It is connected to the injection device 26, through the pipe 25.

The supply of liquid to the mixing container is controlled, in dependence on the resistance offered to the comminuting members by the material being mixed. If too much plasticizer is supplied, then agglomerations form, particularly with emulsion PVC. As a result of this, a greater resistance is offered to the comminuting member and the electric current consumption of the motor of the comminuting member rises considerably. The circulating pump 37 can be automatically set in action or switched off, in known manner, when the current consumption of the chopper motor rises above or drops below a pre-set value. The instruments contained in the instrument pan 42 serve to supervise and control the plant. If a product which is always to be heated to the same final temperature is to be produced in the plant illustrated, then an element may be mounted at a suitable point in the mixing container and may switch off one or more choppers shortly before the final temperature is reached and initiate, for example, the hydraulic actuation of the discharge piston 10 when the desired final temperature is reached. The mixer is then closed again through a timing relay. If the transfer of synthetic plastic material and plasticizer from storage bunkers into the mixer or into the plasticizer proportioning device is controlled in a suitable manner, a substantially continuous operation of the plant is possible.

The arrows shown in FIGURE 2 indicate the direction of flow of the material being mixed.

What we claim is:

1. An apparatus for mixing of powdered, fine-grained or fibrous materials which comprises in combination
    a vertical closable mixing container, the lower portion of the side wall of the said mixing container being tapered and becoming narrower towards the bottom with an angle of inclination of about 40 to 70°,
    a shaft being mounted centrally and vertically in the base of the said mixing container,
    a rotary conveyor member being mounted on the said shaft close to the bottom of the said mixing container and being formed in such a way that, on its rotation, the material being mixed is conveyed outwards from the centre of the mixing container and is forced up the wall of the mixing container by following material,
    at least one rapidly rotating comminuting member comprising crossed knives and being mounted in the tapered portion of the container wall,
    a device for driving the shaft, on which the conveyor member is mounted, at such a speed that the material being mixed is conveyed up the wall of the said mixing container at least up to the said comminuting member,
    a device for driving the said rapidly rotating comminuting member,
    the devices for driving the conveyor member and the comminuting member being mounted outside of the mixing container,
    and a closable outlet in the side wall of the mixing container, close to the bottom of the said container.

2. An apparatus as claimed in claim 1, wherein the lower tapered portion of the side wall of the mixing container has an angle of inclination of about 50 to 60°.

3. An apparatus for the mixing of powdered, fine-grained or fibrous materials which comprises in combination
    a vertical closable mixing container, the lower portion of the side wall of the said mixing container being tapered and becoming narrower towards the bottom with an angle of inclination of about 40 to 70°,
    a shaft being mounted centrally and vertically in the base of the said mixing container,
    a multiarmed centrifugal member being mounted on the said shaft close to the bottom of the said mixing container, the arms of the said centrifugal member running close to the wall of the mixing container and having up-turned projections at their outer ends at the edges which are situated to the rear in the direction of rotation,
    at least one rapidly rotating comminuting member comprising crossed knives and being mounted in the tapered portion of the container wall,
    a device for driving the shaft on which the centrifugal member is mounted at such a speed that the material being mixed is conveyed up the wall of the said mixing container at least up to the said comminuting member,
    a device for driving the said rapidly rotating comminuting member,
    the devices for driving the centrifugal member and the comminuting member being mounted outside of the mixing container,
    and a closable outlet in the side wall of the mixing container, close to the bottom of the said container.

4. An apparatus for the mixing of powdered, fine-grained or fibrous materials which comprises in combination
    a vertical closable mixing container, the lower portion of the side wall of the said mixing container being tapered and becoming narrower towards the bottom with an angle of inclination of about 40 to 70°,
    a shaft being mounted centrally and vertically in the base of the said mixing container,
    a multiarmed centrifugal member being mounted on the said shaft close to the bottom of the said mixing container, the arms of the said centrifugal member running close to the wall of the mixing container and having up-turned projections at their outer ends at the edges which are situated to the rear in the direction of rotation,
    at least one rapidly rotating comminuting member including crossed knives, the outer portions of which are directed towards the interior of the mixing container, the said comminuting member being mounted in the tapered portion of the container wall,
    a device for driving the shaft, on which the centrifugal member is mounted, at such a speed that the material being mixed is conveyed up the wall of the said mixing container at least up to the said comminuting member,
    a device for driving the said rapidly rotating comminuting member,
    the devices for driving the centrifugal member and the comminuting member being mounted outside of the mixing container,
    and a closable outlet in the side wall of the mixing container, close to the bottom of the said container.

5. An apparatus for the mixing of powdered, fine-grained or fibrous materials which comprises in combination
    a vertical closable mixing container, the lower portion of the side wall of the said mixing container being tapered and becoming narrower towards the bottom with an angle of inclination of about 40 to 70°,
    a shaft being mounted centrally and vertically in the base of the said mixing container,
    a multiarmed centrifugal member being mounted on the said shaft close to the bottom of the said mixing container, the arms of the said centrifugal member running close to the wall of the mixing container and having up-turned projections at their outer ends at the edges which are situated to the rear in the direction of rotation,
    at least one rapidly rotating comminuting member including crossed knives the outer portions of which are directed towards the interior of the mixing container, the said comminuting member being mounted in the tapered portion of the container wall,
    a device for driving the shaft, on which the centrifugal member is mounted, at such a speed that the material being mixed is conveyed up the wall of the said mixing container at least up to the said comminuting member,
    a device for driving the said rapidly rotating comminuting member,
    the devices for driving the centrifugal member and the comminuting member being mounted outside of the mixing container,
    a device for spraying liquids onto the materials being mixed, the said device being mounted on the cover plate of the mixing container, and a closable outlet in the side wall of the mixing container, close to the bottom of the said container.

6. An apparatus as claimed in claim 5 wherein a supply pipe for blowing air or other gases into the mixing container is provided in the lower portion of the mixing container.

7. An apparatus as claimed in claim 5 wherein a heating jacket is provided at the outside of the lower tapered portion of the side wall of the mixing container.

8. An apparatus as claimed in claim 5 wherein a cooling mixer of greater useful capacity, is connected with the mixing container.

References Cited in the file of this patent

UNITED STATES PATENTS

| | | |
|---|---|---|
| 306,204 | Allen et al. | Oct. 7, 1884 |
| 345,408 | Birge | July 13, 1886 |
| 2,074,988 | O'Brien | Mar. 23, 1937 |
| 2,080,327 | McKinnis | May 11, 1937 |
| 2,616,340 | Knoll | Nov. 4, 1952 |
| 2,947,524 | Bridges | Aug. 2, 1960 |